US011919555B2

(12) United States Patent
McCormack

(10) Patent No.: US 11,919,555 B2
(45) Date of Patent: Mar. 5, 2024

(54) LAUNDRY CART

(71) Applicant: FDR Services Corp., Hempsted, NY (US)

(72) Inventor: James Joseph McCormack, Lloyd Harbor, NY (US)

(73) Assignee: NORTH SHORE ARCHITECTURE, PC, Hempstead, NY (US)

( * ) Notice: Subject to any disclaimer, the term of this patent is extended or adjusted under 35 U.S.C. 154(b) by 80 days.

(21) Appl. No.: 17/409,666

(22) Filed: Aug. 23, 2021

(65) Prior Publication Data

US 2022/0055674 A1 Feb. 24, 2022

Related U.S. Application Data

(60) Provisional application No. 63/069,117, filed on Aug. 23, 2020.

(51) Int. Cl.
*B62B 3/02* (2006.01)

(52) U.S. Cl.
CPC ............ *B62B 3/02* (2013.01); *B62B 2202/66* (2013.01)

(58) Field of Classification Search
CPC .......... B62B 3/02; B62B 2202/66; B62B 1/00
See application file for complete search history.

(56) References Cited

U.S. PATENT DOCUMENTS

| 2013/0313029 A1* | 11/2013 | Franco | B62B 3/02 |
| | | | 280/79.2 |
| 2016/0280243 A1* | 9/2016 | Devers | A47G 25/0664 |
| 2022/0017132 A1* | 1/2022 | Rowland | B62B 5/028 |

FOREIGN PATENT DOCUMENTS

| FR | 2852278 A1 * | 9/2004 |
| WO | WO 0112045 A1 * | 2/2001 |

* cited by examiner

*Primary Examiner* — James A Shriver, II
*Assistant Examiner* — Nicholas R. Kandas
(74) *Attorney, Agent, or Firm* — Torrey Pines Law Group, PC

(57) ABSTRACT

A laundry cart and methods for using it are described herein. The laundry cart has the ability to dump laundry from its shelves to the bottom surface of the laundry cart via rotatable shelves, eliminating the need to remove laundry from each shelf. In addition, the rotatable nature of the shelves allows the shelves to effectively close the laundry cart for effective transportation of laundry, minimizing spillage of laundry out of the laundry cart during transit.

17 Claims, 12 Drawing Sheets

LAUNDRY CART

CROSS-REFERENCE TO RELATED APPLICATIONS

Figure 1:
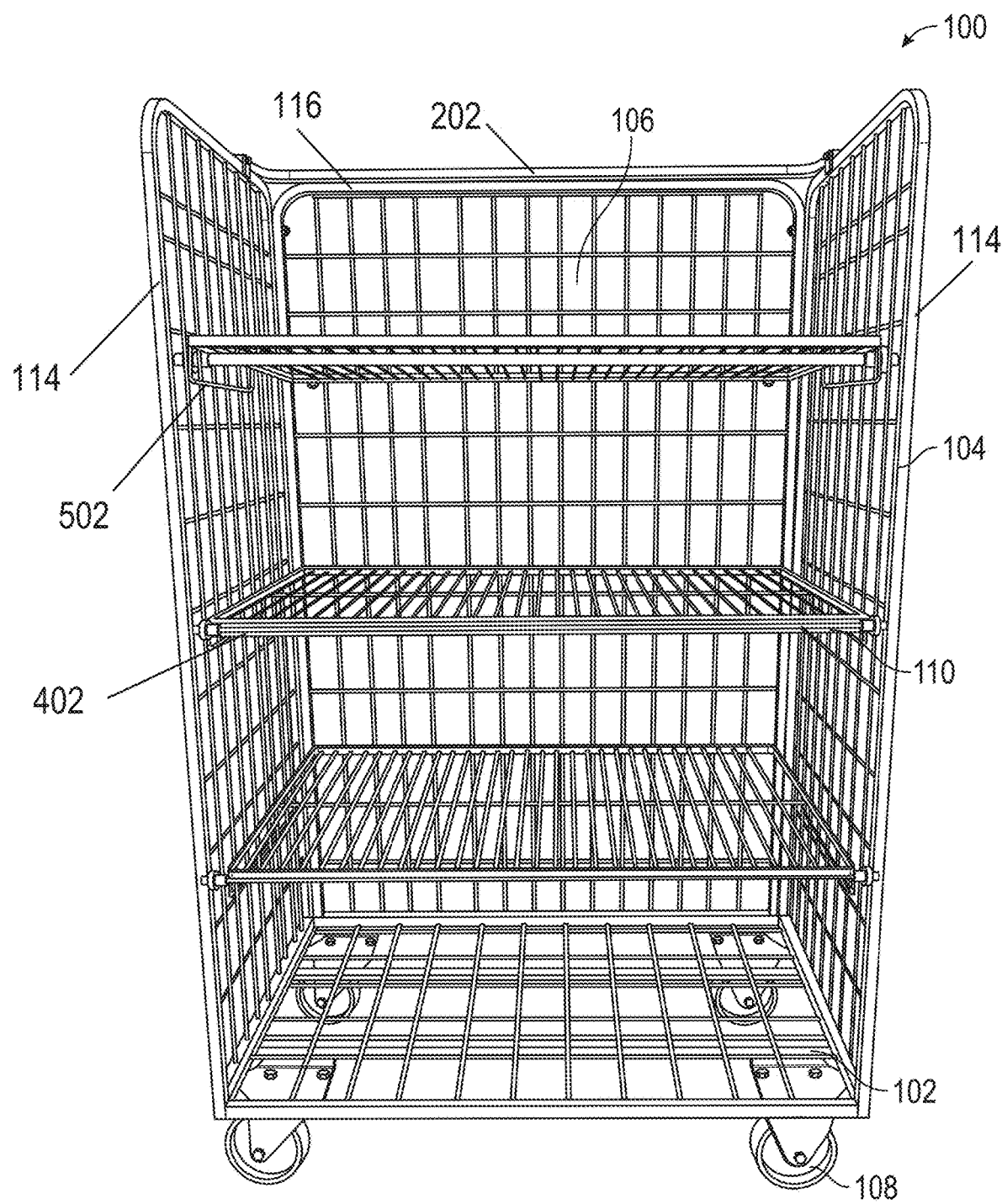

This application claims priority from U.S. Provisional Application No. 63/069,117, which is incorporated herein by reference in its entirety.

FIELD

The present teachings relate to a laundry cart for transporting items and methods for using said laundry cart.

INTRODUCTION

Efficiently unloading and loading laundry while transporting it securely can be a burdensome task. A solution that allows for the quick removal of laundry, the efficient packing of laundry, and convenient transportability of laundry without losing laundry during transport would be quite helpful to those in the laundry industry.

SUMMARY

The present teachings include a laundry cart having a bottom shelf, a left side and a right side, each attached to a back, a plurality of rotatable shelves, and a plurality of casters connected to the bottom shelf's base for rollability. The back is connected at its base to the bottom shelf. Shelves, when parallel to the bottom surface in a horizontal orientation, allow for items to be placed on the shelves. In one aspect, casters can connect to the base of the bottom surface by 5 inch by 7 inch plates with four mounting holes, but one of skill in the art would recognize that different plate dimensions and number of mounting holes are possible. Casters may range from 4 to 8 inches and may be swivel, non-swivel or a combination of both. The left and right sides and the back comprise a ¾ inch frame, although one of skill in the art would recognize that other sizes may be used.

In accordance with a further aspect, the shelf rests on a rotating bar when the shelf is parallel to the bottom surface. The rotating bar spans the distance of a side surface to another side surface. While the rotating bar may have a ⅜ inch diameter, one of skill in the art would acknowledge that other dimensions are allowable.

In accordance with yet a further aspect, the at least one shelf has an arm that is in contact with the rotating bar. The arm fits around the rotating bar. When the shelf is parallel to the bottom surface, the arm stays in contact with the rotating bar.

In accordance with yet a further aspect, at the back of the shelf, there is a latch that allows the shelf to be supported by a side surface. The latch may be ⅜ inches, but one of skill in the art would recognize that other dimensions are possible based on the side surface.

In accordance with yet a further aspect, a spacer is disposed at opposing ends of the rotating bar to facilitate the movement of the shelf. The spacer may have a diameter of 1 inch, but other dimensions are possible depending on the dimensions of the rotating bar. A washer sandwiched around the rotating bar also assists with movement of a shelf to various positions. The washer may be 1.5 inches, but other dimensions are possible, also depending on the dimensions of the rotating bar.

In accordance with yet a further aspect, the rotating bar rotates to allow the shelf to move to different positions. Indeed, in addition to being parallel to the bottom shelf, the arm of the shelf may slide in relation to the rotating bar, allowing the shelf to be parallel to the back in a vertical orientation. Angles in between being parallel to the bottom shelf and parallel to the back are also possible.

In accordance with yet a further aspect, the shelf may rotate all the way to being parallel to the back and perpendicular to the left and right sides to form a front surface, effectively enclosing the cart, which helps retain items in the cart during transport with minimal item spillage. If shelves are parallel to the bottom shelf, when being rolled, it is possible for items to easily fall off the cart.

In accordance with yet a further aspect, the bottom shelf provides a surface for attachment of the casters. While all other shelves are rotatable, the bottom surface is not rotatable and only acts as a shelf permanently affixed to the lower ends of the sides and back of the cart.

In accordance with yet a further aspect, the shelves are comprised of a pattern of parallel bars. The pattern allows for items to be hanged from the shelves.

In accordance with yet a further aspect, the shelf is removable from the cart, typically for repairs. In its usable state, the shelves are connected via their arms to the rotating bar.

In accordance with yet a further aspect, a hanger bar, in its non-use state, connects to the top frame of the back by a magnet. The magnet keeps the hanger bar in its non-use state. For the hanger bar to be usable, it is flipped away from the back so that items may hang be hung from it. While the magnet may connect to the top frame of the back, it may also connect to the top frame of one of the sides to keep the hanger bar in the non-use state.

In accordance with yet a further aspect, the left and right sides and back may be comprised of a pattern of perpendicular and parallel bars. While 3/16 inch round bars may be used to create a 3 inch by 5 inch pattern of perpendicular and parallel bars, one of skill in the art would recognize that other sizes of bars forming different sizes of pattern may be used.

In accordance with yet a further aspect, the shelves are rotatable so that items resting on the shelves may fall off, making it easier to collect items at the bottom of the cart as opposed to removing items from each shelf.

In accordance with yet a further aspect, the casters roll, allowing the cart to roll. While the cart may roll with shelves parallel to the bottom shelf, it may also roll with shelves oriented parallel to the back. In either configuration, it is possible to hang items from the hanger bar and from the shelves, as the shelves have a pattern that may accommodate hanging items.

The present teachings include methods for using the cart, comprising rotating shelves to allow items on the shelves to fall off, hanging items on the hanger bar after flipping it away from the back surface, and rotating the shelves so that they are oriented vertically to be parallel to the back.

These and other features, aspects and advantages of the present teachings will become better understood with reference to the following description and appended claims.

DRAWINGS

Those of skill in the art will understand that the drawings, described below, are for illustrative purposes only. The drawings are not intended to limit the scope of the present teachings in any way.

FIG. 1. A front view of the laundry cart.

Figure 2:
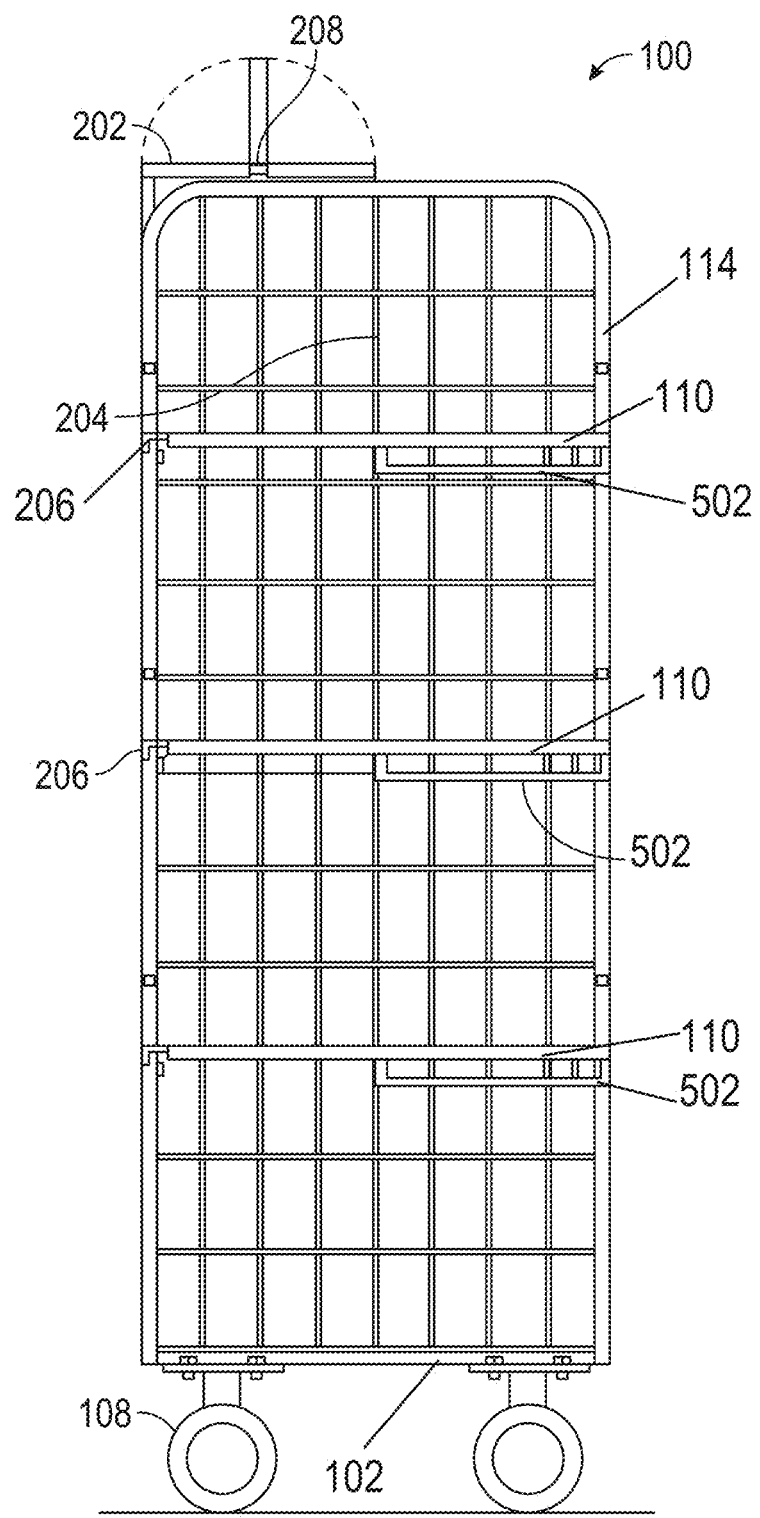

FIG. 2. A side view of the laundry cart.

Figure 3:
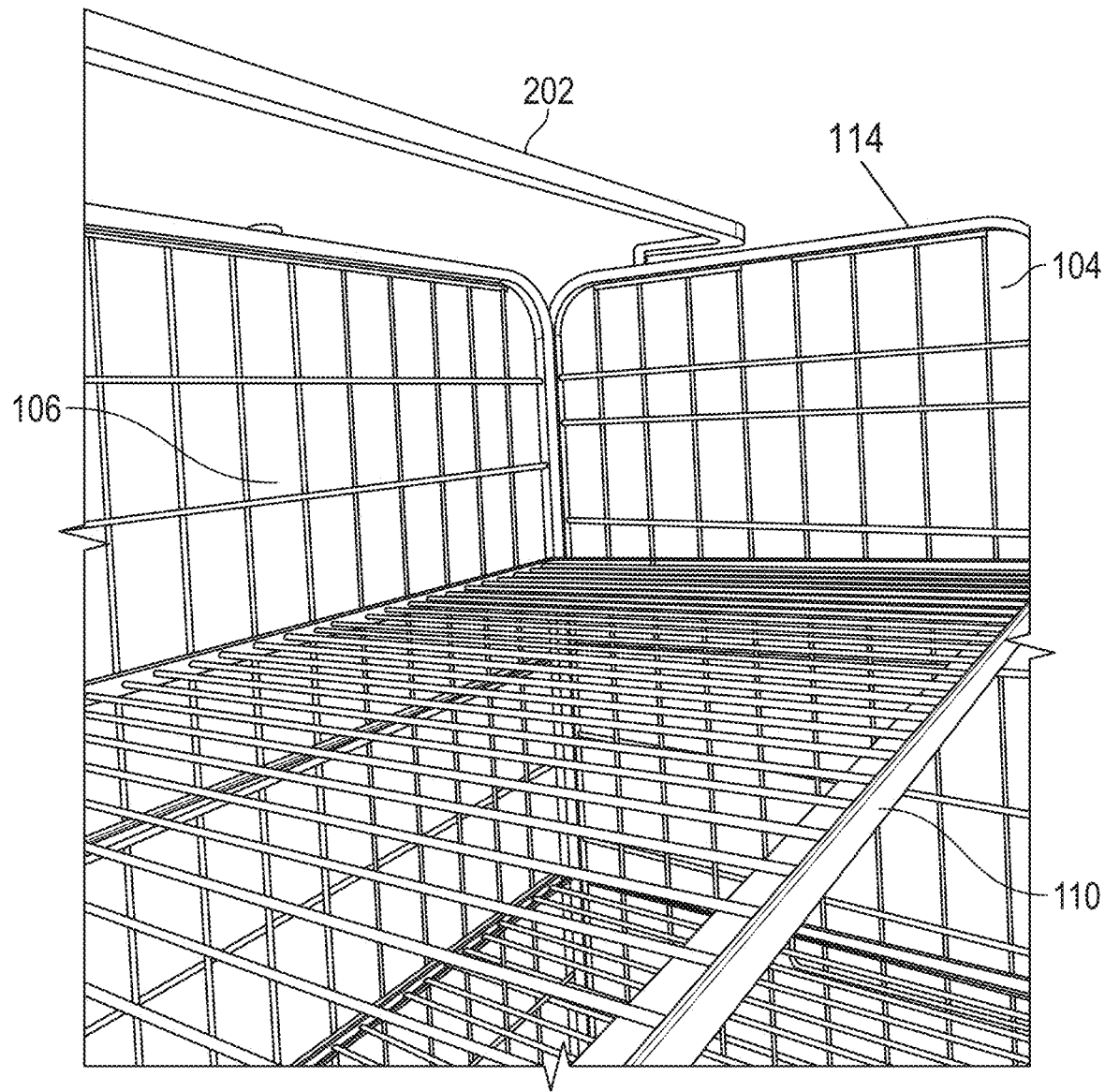

FIG. 3. A perspective view of the laundry cart showing the hanger bar in the usable state.

Figure 4:
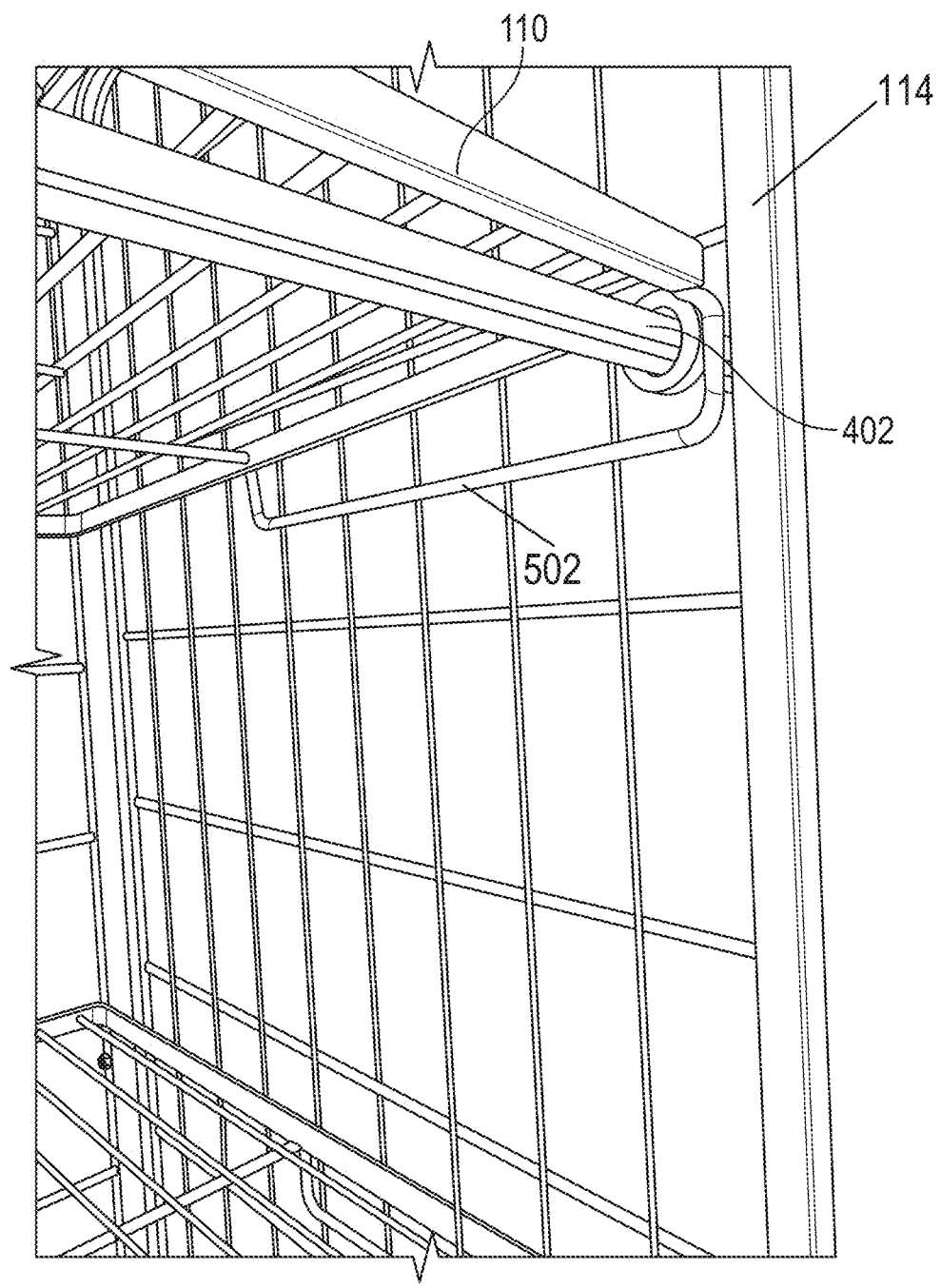

FIG. 4. A perspective view of the shelf and rotating bar, with the shelf parallel to the bottom surface.

Figure 5:
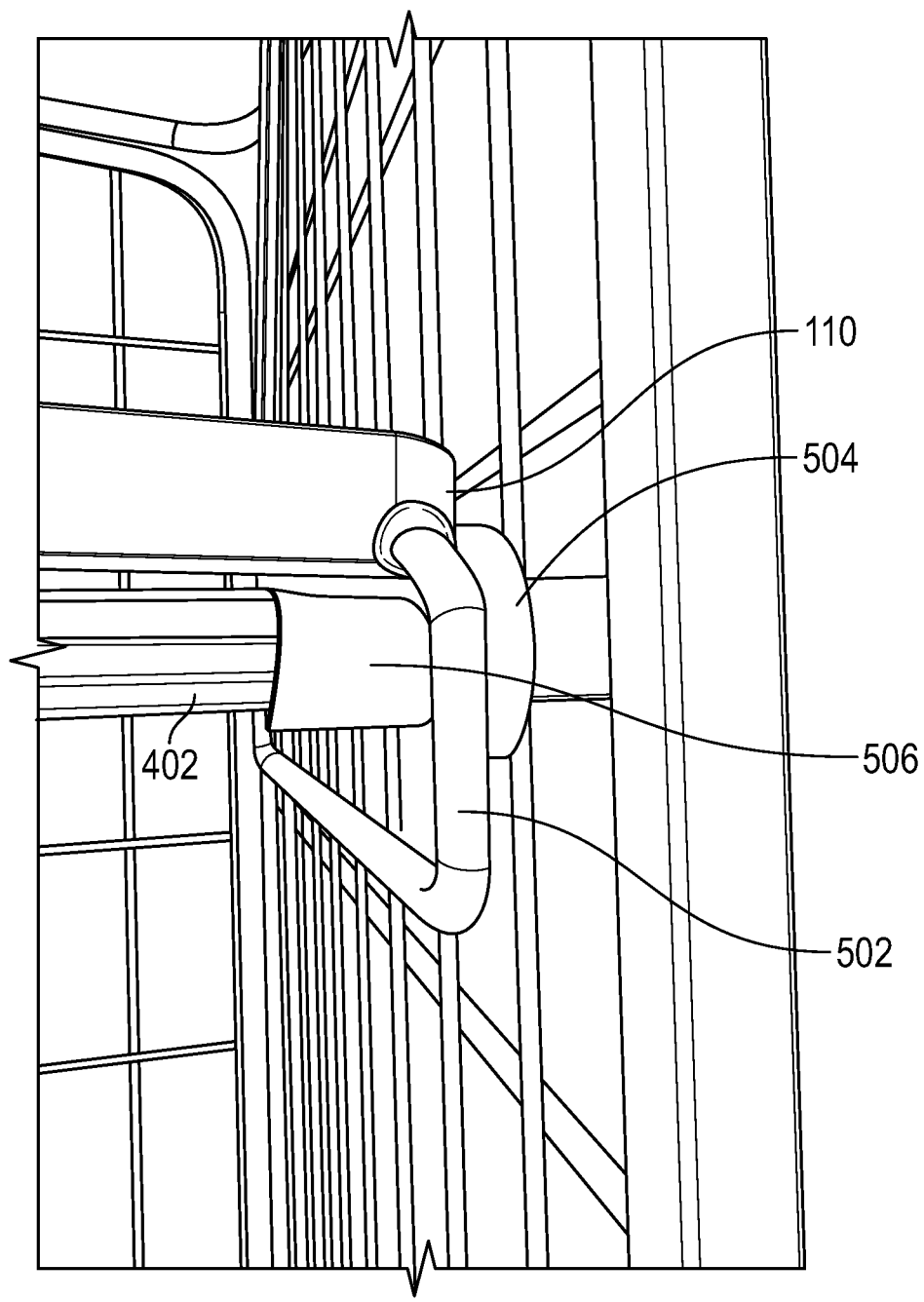

FIG. 5. A perspective view of the arm of the shelf and the spacer and washer of the rotating bar.

Figure 6:
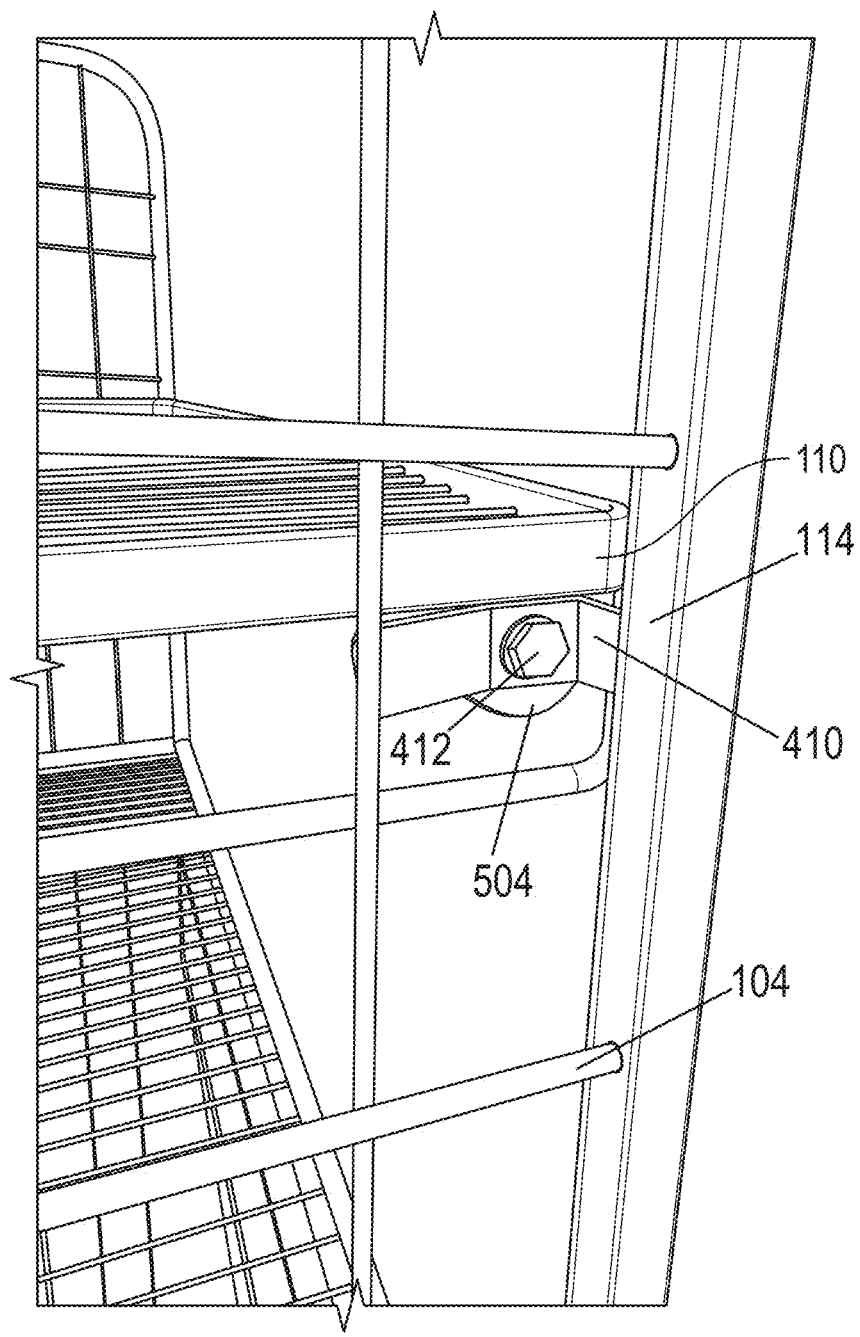

FIG. 6. Another perspective view of the shelf.

Figure 7:
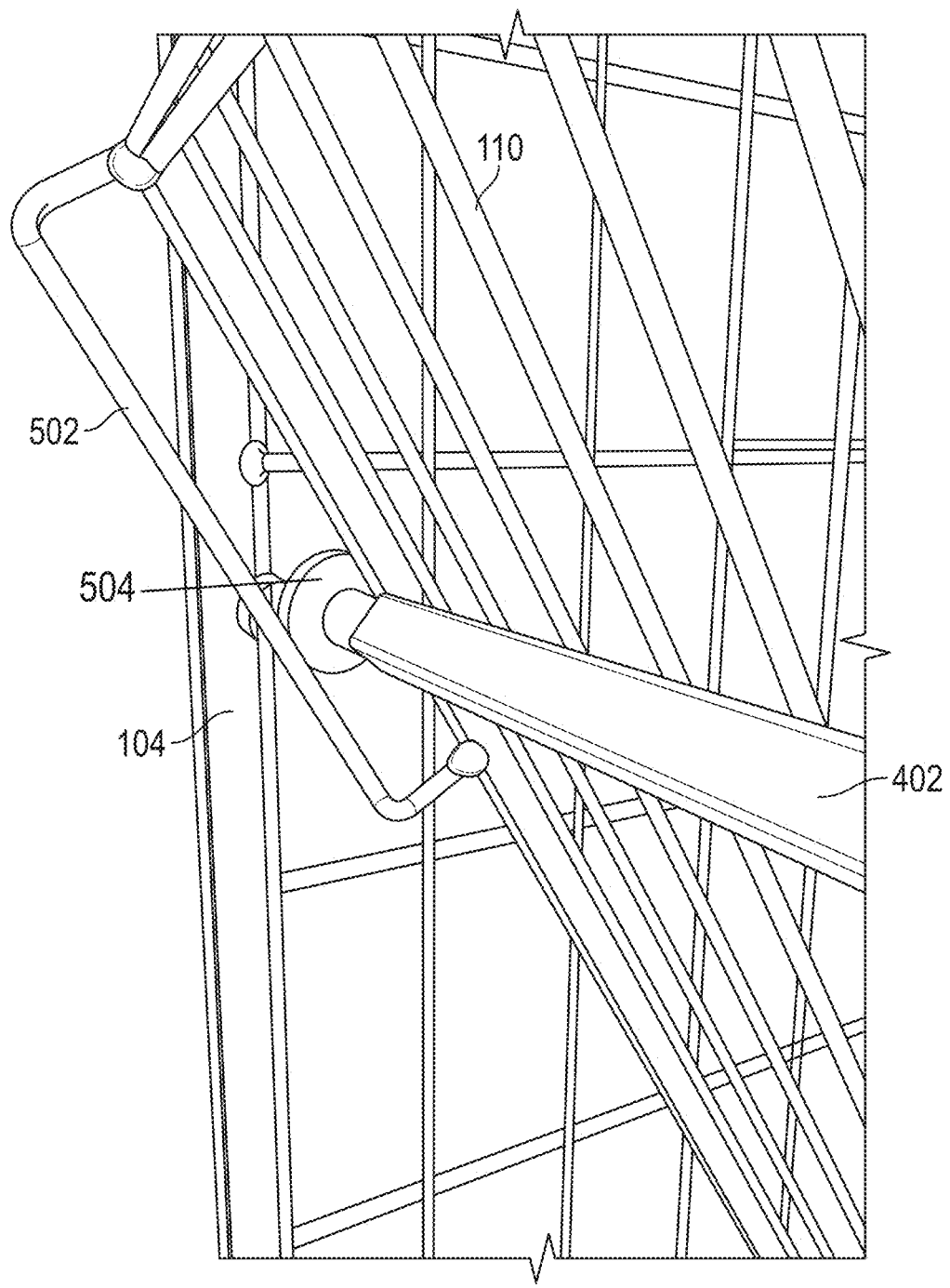

FIG. 7. A perspective view of the shelf at an angle not parallel to the bottom and not parallel to the back surface.

Figure 8:
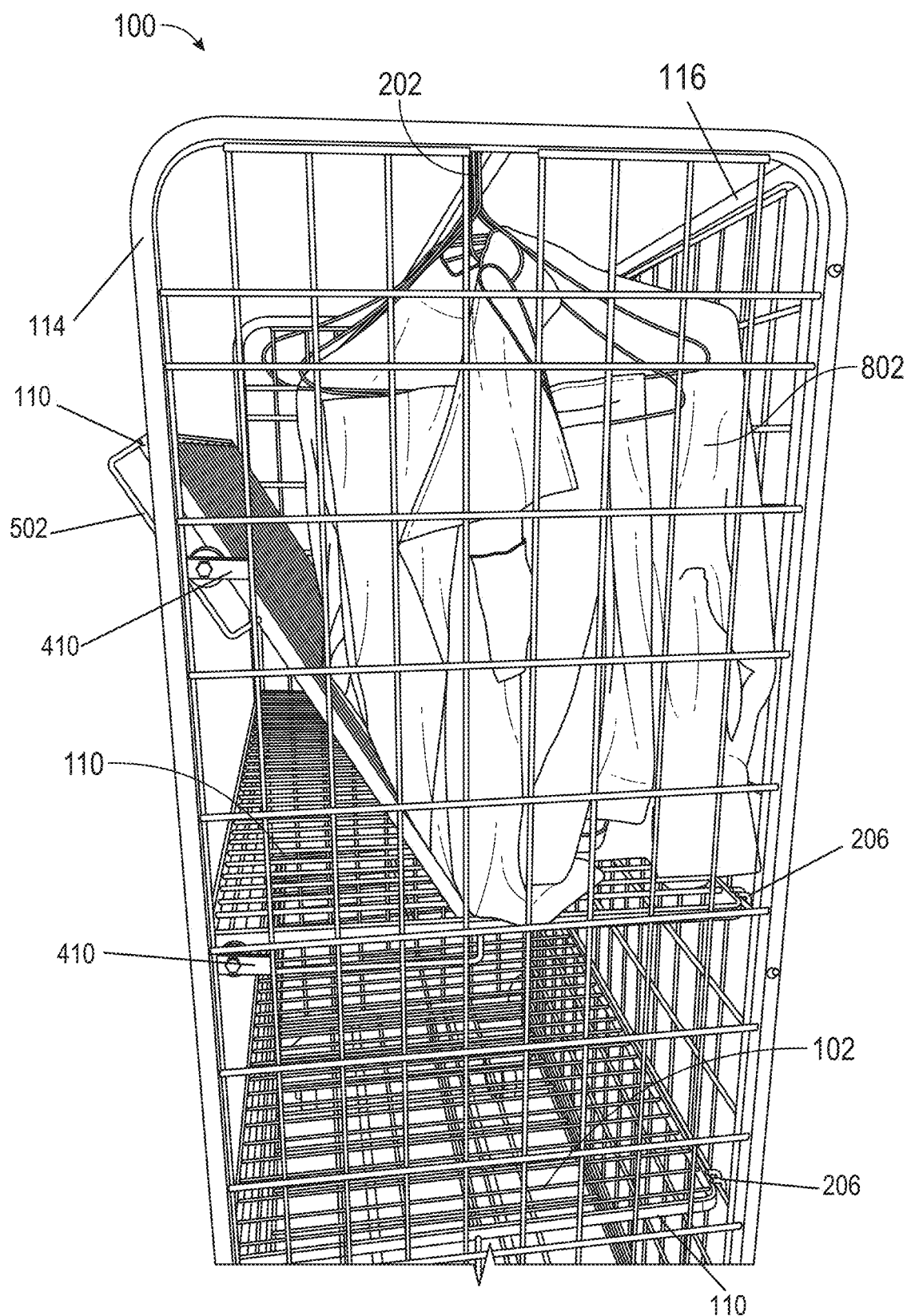

FIG. 8. A side view of the laundry cart, with the hanger bar deployed and items hanging from the hanger bar.

Figure 9:
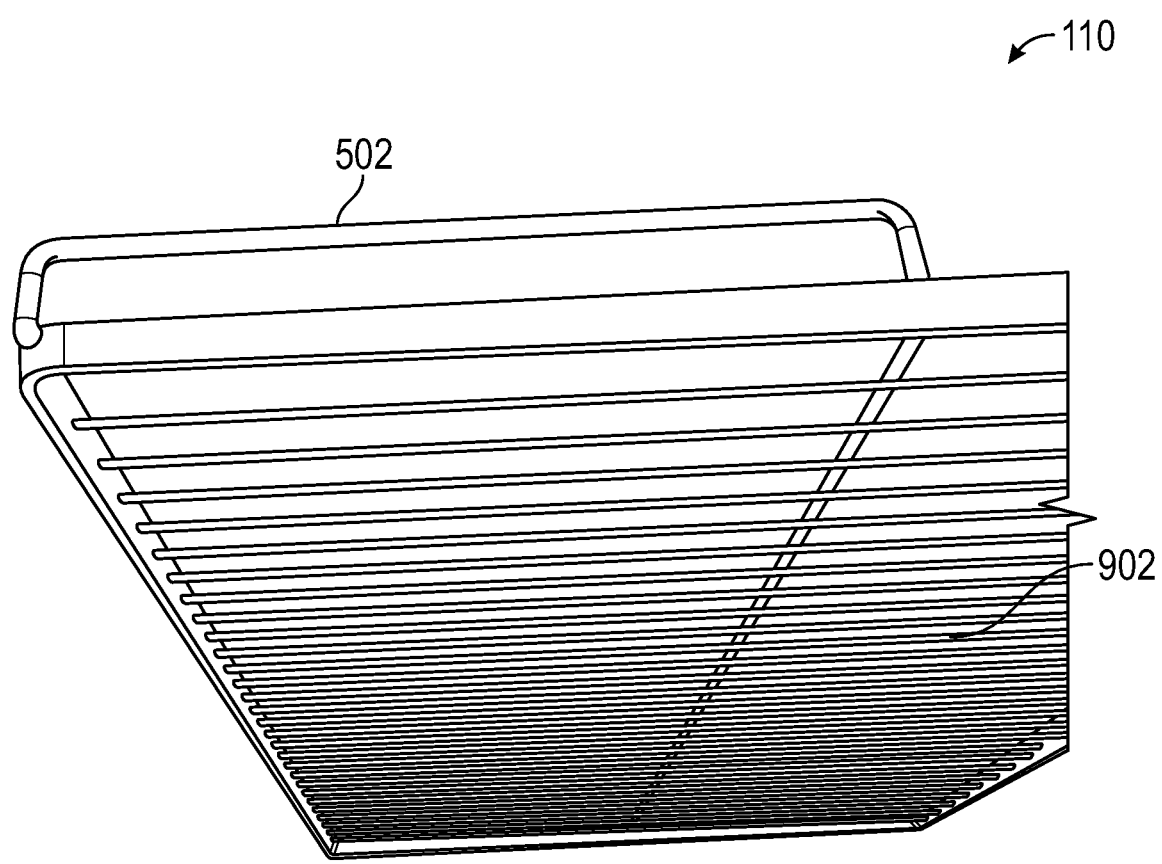

FIG. 9. A perspective view of the shelf in an inverted position.

Figure 10:
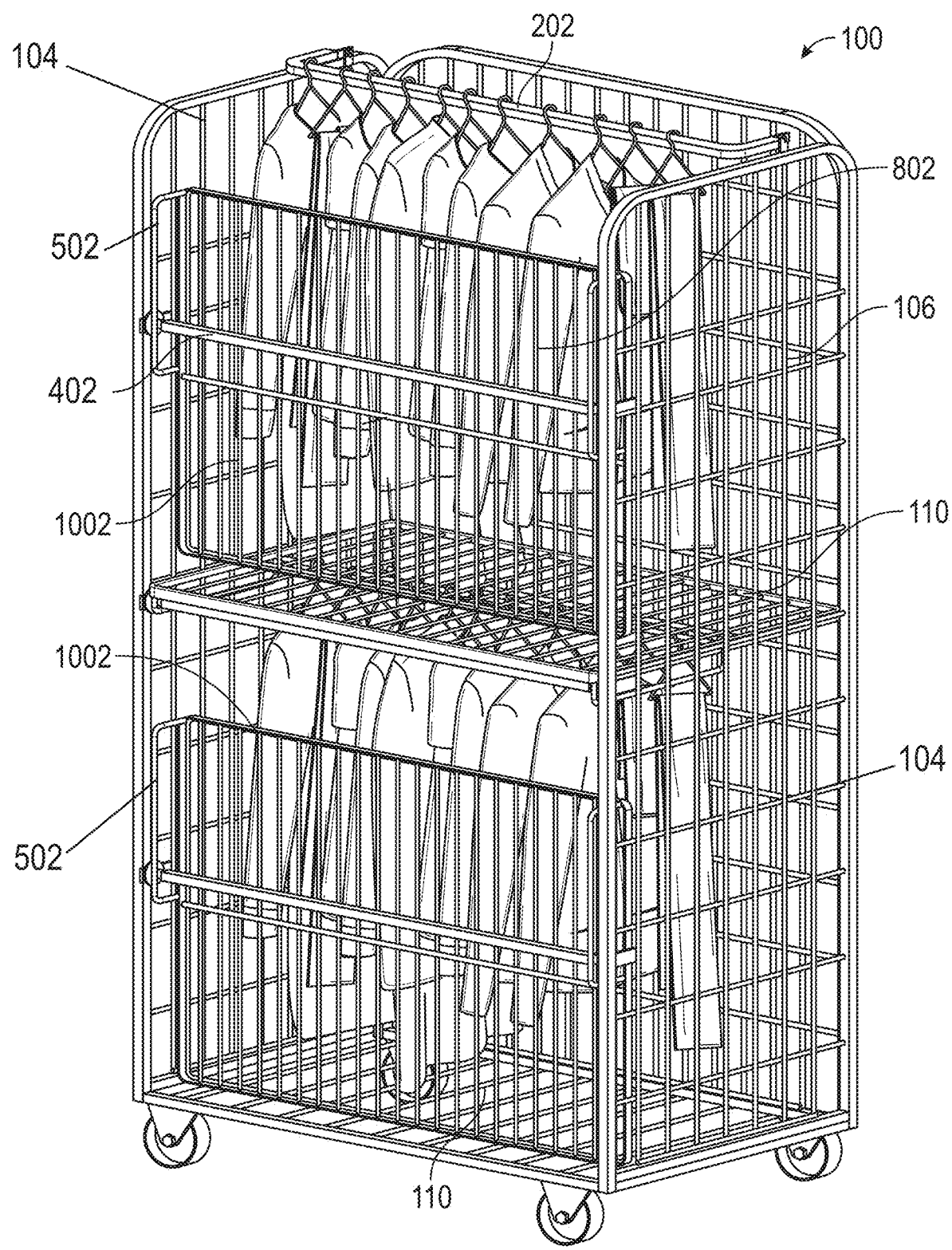

FIG. 10. A perspective view of the laundry cart, with shelves parallel to the back surface, forming a front surface, and items hanging from both the hanger bar and a shelf.

Figure 11:
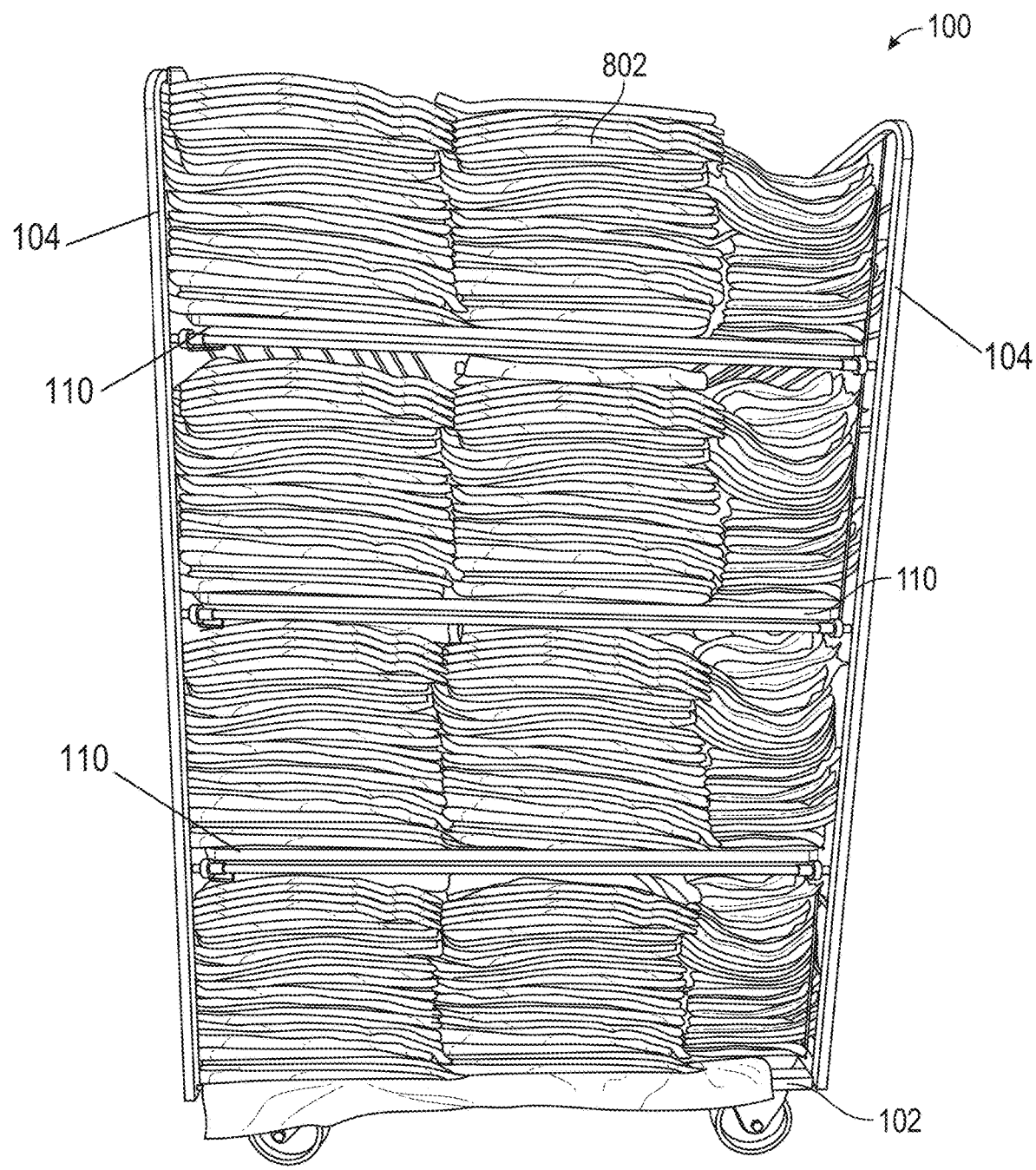

FIG. 11. A front view of the laundry cart with items resting on shelves.

Figure 12:
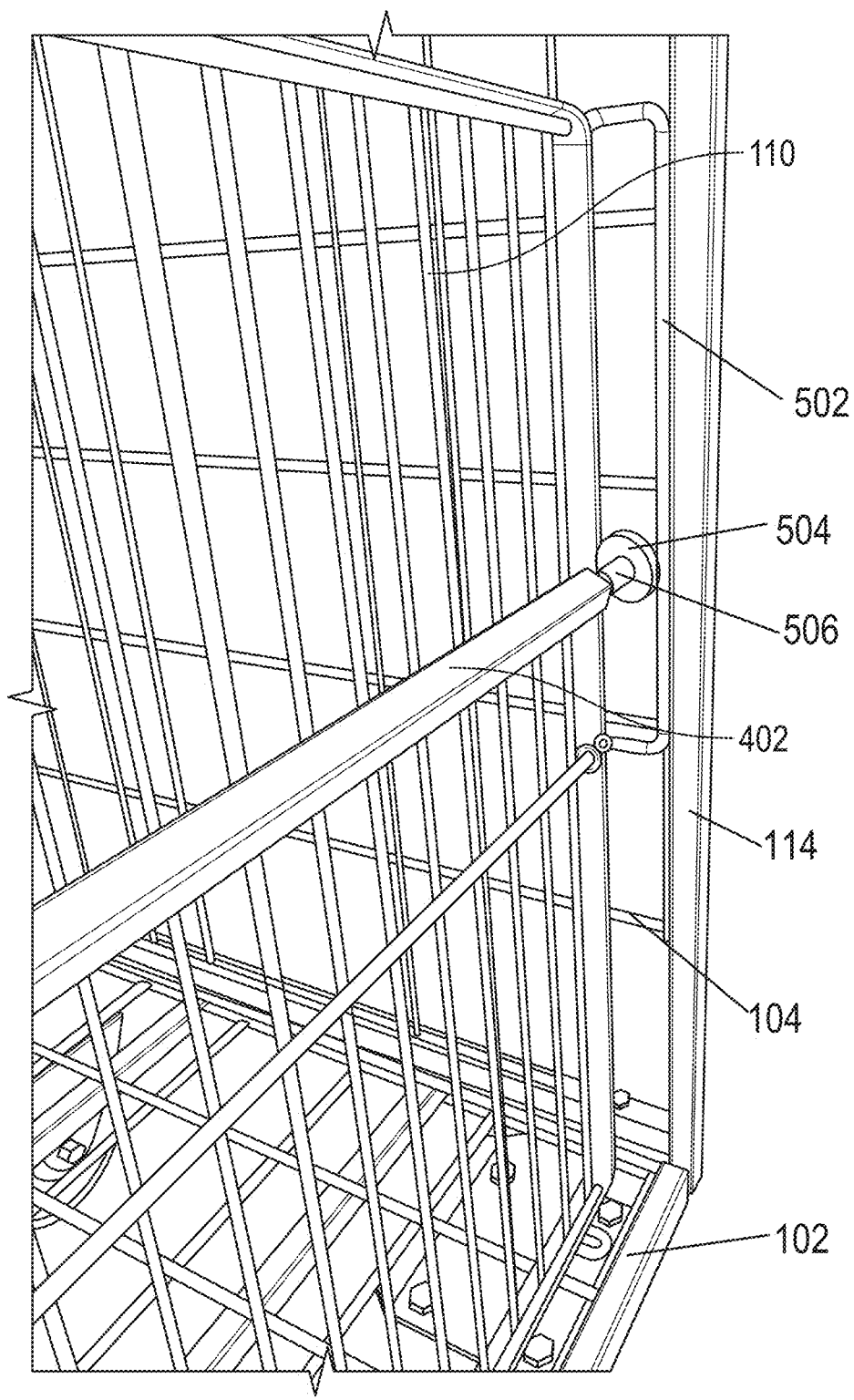

FIG. 12. A perspective view of a shelf, with the shelf parallel to the back surface.

DETAILED DESCRIPTION

The present invention is directed to a laundry cart 100, as seen in FIG. 1. The laundry cart has a bottom shelf 102, left and right sides 104, a back 106, casters 108, and at least one shelf 110 configured to extend between the left and right sides 104. Each side 104 and the back 106 has a frame 114 and 116, respectively, at its outer perimeter. The bottom shelf 102 and back 106 are each connected at a perpendicular angle to the sides 104 to form a four-sided assembly. Casters 108 are connected to the lower surface of the bottom shelf 102, allowing the laundry cart 100 to roll. As shown, a caster 108 is positioned near each corner of the rectangular bottom shelf 102.

FIG. 2 depicts a side view of the laundry cart 100. A latch 206 at the back of the shelf 110 latches onto the side surface 104 so that the shelf 110 can support items. The side surface 104 may be comprised of a perpendicular and parallel pattern of bars 204, though one of skill in the art would recognize that other patterns are possible. The hanger bar 202 is in its non-use state; items do not hang from the hanger bar 202 in this state. A magnet 208, which may contact the side surface 104 or the back surface 106, keeps the hanger bar 202 in the non-use state.

FIG. 3 shows the hanger bar 202 pivoted toward the front of the cart in the deployed state, i.e., the state by which items may be hung from the hanger bar 202. The shelf 110 may be parallel to the bottom shelf 102 in a horizontal orientation, with a side 104 and back 106 also visible. Items may be placed on the shelf 110 in this configuration.

In FIG. 4, the shelf 110 and rotating bar 402 are depicted. When parallel to the bottom surface 106, the shelf 110 rests on the rotating bar 402.

In FIG. 5, the arm 502 of the shelf 110 is resting on the rotating bar 402. The washer 504 and spacer 506 fit around the rotating bar 402, allowing for movement of the shelf 110 in relation to the rotating bar 402.

FIG. 6 shows another view of the shelf 110 in a horizontal orientation in which items may rest on the shelf 110. It is possible for the shelf 110 to be rotated in other positions, dependent on the rotation of the rotating bar 402. Bracket 410, attached to side frame 114, connects bar 402 (not visible behind washer 504) to side 104 via fastener 412.

FIG. 7 shows the shelf 110 in an angled position that is neither parallel to the bottom shelf 102 nor parallel to the back 106. The arm 502 is tilted at angle with respect to the rotating bar 402 such that items that may be sitting on top of the shelf 110 would slide off. At this angle, items falling to the bottom shelf 102 allows for quick pickup of the items at the bottom shelf 102 as opposed to separately removing items from each shelf 110.

FIG. 8 shows a side view of the laundry cart 100, with items of laundry 802 hanging from the hanger bar 202. While laundry 802 is shown hung using hangers, it is also possible to drape laundry 802 over the hanger bar 202. As shown in FIG. 8, the middle shelf 110 is oriented horizontally, parallel to the bottom shelf 102, while the upper shelf 110 is rotated at an angle that is not parallel to the bottom shelf 102.

FIG. 9 shows the shelf 110 separated from the laundry cart 100 in an inverted orientation. A pattern of parallel bars 902 forms the shelf 110. The arm 502 is shown extending from the bottom at the side of shelf 110.

FIG. 10 shows a perspective view of the laundry cart 100, with shelves 110 rotated to form a front wall 1002, where the shelves 110 are oriented vertically so they are parallel to the back 106. When the shelves 110 are in this configuration, they effectively close the laundry cart 100, making it easier to transport laundry 802 without any laundry 802 falling out of the laundry cart 100. Laundry 802 hangs from the hanger bar 202 and may also hang from a shelf 110. The open pattern of parallel bars 902 allows laundry 802 to be hung from a shelf 110.

Laundry 802 resting on all shelves 110 of the laundry cart 100 is depicted in FIG. 11. It is possible for some of the shelves 110 to be rotated to create the front wall 1002, while the bottom shelf 102 and any remaining shelves may be used for supporting laundry 802. Laundry 802 may also be hung from shelves 110 that are not vertically oriented. See, for example, the middle shelf 110 in FIG. 10. Various shelf configurations are possible.

FIG. 12 depicts a shelf 110 in the configuration that has been rotated to create a front wall 1002, i.e., the shelf 110 is in a vertical orientation, parallel with the back 106. In this configuration, the rotated shelf encloses the cart making it possible to transport laundry 802 with minimal spillage of the laundry 802 out of an otherwise open front of the laundry cart 100.

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. A cart comprising:
   a bottom shelf having a plurality of casters extending downwardly therefrom;
   left and right walls attached to and extending upward from and perpendicular to the bottom shelf, each of the left and right walls having a front portion and a back portion;

a back wall extending vertically upward from the bottom shelf and connecting to the back portions of the left and right walls;
a plurality of bars extending horizontally between the front portions of the left and right walls, the bars spaced apart at different heights along the left and right walls;
a plurality of shelves extending between the left and right walls, each shelf supported on a corresponding bar of the plurality of bars, each shelf having a left side, a right side, a shelf front, a shelf back, and a latch extending from the shelf back, the latch configured to releasably support the shelf back in a position parallel to the bottom shelf; and
an arm extending downward from the left side and right side of each shelf, the arm configured to maintain the shelf in slidable contact with the corresponding bar, wherein when the latch is released and the shelf is slid forward from the back wall, the entire shelf is rotatable to an angle that is not parallel to the bottom shelf.

2. The cart of claim 1, wherein each bar has a spacer and a washer disposed at each end to guide movement of the shelf.

3. The cart of claim 1, wherein each shelf is configured to separately rotate to a vertical orientation to form a front wall that is parallel to the back wall.

4. The cart of claim 1, wherein each shelf comprises a pattern of parallel bars.

5. The cart of claim 1, further comprising a hanger bar disposed on top of each of the left and right walls, the hanger bar configured for hanging laundry items in an interior of the cart.

6. The cart of claim 5, wherein the hanger bar is pivotally attached to each of the left and right walls, wherein the hanger bar is configured to lie flat on top of the back wall when not in use and to swing forward for use.

7. The cart of claim 1, wherein each of the left and right walls and the back wall comprise a pattern of parallel bars and perpendicular bars.

8. The cart of claim 1, wherein the plurality of bars and the plurality of shelves comprise three bars and three shelves defining an upper shelf, a middle shelf, and a lower shelf, wherein rotation of each of the upper shelf and the lower shelf to a vertical orientation defines an upper enclosure and a lower enclosure, respectively, within the cart.

9. The cart of claim 8, wherein the middle shelf is configured for hanging additional laundry items in the lower enclosure.

10. A laundry cart, comprising:
a four-sided assembly comprising a bottom shelf, left and right side walls extending upward from and perpendicular to the bottom shelf; and a back attached to and extending between the left and right side walls;
a plurality of casters extending downward from the bottom shelf;
a plurality of bars extending across a front of the four-sided assembly at different heights above the bottom shelf;
a plurality of shelves extending between the left and right side walls, each shelf supported on a corresponding bar of the plurality of bars, each shelf having a left side, a right side, a shelf front, a shelf back, and a latch extending from the shelf back, the latch configured to releasably support the shelf back in a position parallel to the bottom shelf, each shelf having an arm extending downward from each of the left side and right side, the arm configured to maintain the shelf in slidable contact with the corresponding bar, wherein when the latch is released and the shelf is slid forward from the back, the entire shelf is rotatable to an angle that is not parallel to the bottom shelf.

11. The laundry cart of claim 10, wherein each shelf is configured to rotate to a vertical orientation to form a partial front wall that is configured to at least partially enclose the four-sided assembly.

12. The laundry cart of claim 10, wherein each shelf comprises a pattern of parallel bars.

13. The laundry cart of claim 10, further comprising a hanger bar having ends disposed on top of each of the left and right walls, the hanger bar configured for hanging laundry items in an interior of the four-side assembly.

14. The laundry cart of claim 13, wherein the hanger bar is pivotally attached to each of the left and right walls, wherein the hanger bar is configured to lie flat on top of the back when not in use and to be swung forward for use.

15. The laundry cart of claim 10, wherein each of the left and right walls and the back comprises a pattern of parallel bars and perpendicular bars.

16. The laundry cart of claim 10, wherein the plurality of bars and the plurality of shelves comprise three bars and three shelves defining an upper shelf, a middle shelf, and a lower shelf, wherein rotation of each of the upper shelf and the lower shelf to a vertical orientation defines an upper enclosure and a lower enclosure, respectively, within the cart.

17. The cart of claim 16, wherein the middle shelf is configured for hanging additional laundry items in the lower enclosure.

* * * * *